3,282,891
POLYPROPYLENE STABILIZED WITH A COMBINATION OF GLYCEROL AND PHENOLS
Delos E. Bown, Norman P. Neureiter, and Isaac J. Satterfield, Baytown, Tex., assignors to Humble Oil & Refining Company
No Drawing. Filed Feb. 16, 1959, Ser. No. 793,272
8 Claims. (Cl. 260—45.95)

This invention relates to the inhibition of color formation in normally solid high molecular weight polymers of polypropylene. More particularly, this invention relates to a method for inhibiting the discoloration of propylene polymers and to the polymer compositions prepared by the method.

Propylene may be polymerized under moderate polymerization conditions in the presence of heterogeneous anionic-type polymerization catalysts in order to provide high molecular weight polypropylene. The commonly used heterogeneous anionic-type polymerization catalyst comprises a titanium subhalide such as titanium trichloride, titanium dichloride, titanium tribromide, etc. activated with a suitable reducing compound such as an aluminum alkyl.

The polymerization reaction is conducted in the presence of a non-polar organic diluent, sometimes referred to as a solvent. The solvent may be an aromatic hydrocarbon such as benzene, xylene, toluene, etc.; an aliphatic hydrocarbon such as hexane, heptane, octane, etc.; a naphthenic hydrocarbon such as cyclohexane, methylcyclohexane, decalin, etc.; a halogenated hydrocarbon such as chlorobenzene, ortho-dichlorobenzene, etc.; or a suitable mixture of two or more such diluents.

During the course of the polymerization reaction, the propylene that is polymerized in the presence of the heterogeneous anionic stereospecific polymerization catalyst tends to precipitate from the solvent to form a slurry of polymer particles. These polymer particles intermix with the polymerization catalyst, whereby the catalyst becomes a source of contamination in the final polymer product.

Accordingly, at the end of the polymerization reaction it is generally necessary to solvate as large an amount of the catalyst components as possible in order to provide a polymer product having a minimized ash content. Suitable solvating agents include polar compounds such as aliphatic alcohols (methanol, ethanol, isopropyl alcohol, etc.); ethers such as diethyl ethers, di-n-butyl ethers, etc.; ketones such as acetone, methylethylketone, etc. Materials of this nature will remove a substantial portion of the catalyst components.

Deashing may be further improved by the introduction of chelating agents such as acetylacetone, disalicylethylenediamine, hydroxyquinoline, etc. Through the use of chelating agents, substantially all of the ash components of the polymer may be removed so that only a few parts per million (e.g., 100 or less) of metal contaminants are present in the polymer. However, it is generally not feasible to remove all of the ash components inasmuch as exhaustive washing is required for this purpose.

In order to provide a satisfactory polypropylene product, it is necessary that there be incorporated thereinto an oxidation inhibitor or stabilizer which will prevent decomposition of the polypropylene at the elevated temperatures which are necessary for molding a polymer into useful objects. Stabilizers that may be used with particular advantage for this purpose include 2,2'-methylenebis(4-methyl-6-tertiarybutylphenol),
4,4'-thiobis(3-methyl-6-tertiarybutylphenol),
4,4'-methylenebis(2,6-ditertiarybutylphenol), and
4,4'-methylenebis(2-methyl-6-tertiarybutylphenol).

By following the above generally outlined sequence, it is possible to obtain an initially colorless polypropylene composition comprising polypropylene, a minor amount of ash components, an inhibiting amount of an anti-oxidant as set forth above, a residual quantity of diluent, a residual quantity of solvating agent, and, when a chelating agent is employed, residual quantities of chelating agent. However, when such colorless polymer compositions are heated above the melting point of the polymer, as is necessary when the composition is to be converted into molded objects, severe discoloration of the polymer occurs.

The severe discoloration referred to above is prevented in accordance with the present invention by further incorporating into the polymer composition a colorstabilizing amount of glycerol.

Accordingly, the compositions of the present invention may be defined as compositions comprising normally solid high molecular weight polypropylene having incorporated therein stabilizing amounts of glycerol and an oxidation inhibitor selected from the class consisting of 2,2'-methylenebis(4-methyl-6-tertiarybutylphenol),
4,4'-thiobis(3-methyl-6-tertiarybutylphenol),
4,4'-methylenebis(2,6-ditertiarybutylphenol), and
4,4'-methylenebis(2-methyl-6-tertiarybutylphenol).

The present invention will be further illustrated by the following specific examples which are given by way of illustration and not as limitations on the scope of this invention.

The polymer employed in the following working examples was a high molecular weight polypropylene which had been prepared by polymerizing propylene in the presence of titanium trichloride activated with triethyl aluminum in the presence of a xylenes diluent.

The polymer formed by this reaction was initially present in the form of a slurry of polymer particles in the xylenes diluent. The slurry was treated with methanol and acetylacetonate in order to remove all but trace amounts of the ash components attributable to the catalyst. Thus, the finished polymer contained less than about 100 parts per million of titanium.

*Example 1*

A sample of the above-described polymer was exhaustively washed for a period of about 50 hours to provide a product containing less than about 5 p.p.m. of titanium.

The thus-washed polymer was melted in an inert atmosphere. There was no discoloration of the polymer.

The polymer was thereafter heated in a lead bath until substantial decomposition of the polymer had occurred. Again, there was no development of color, although the polymer degraded to a white friable powder.

Another sample of the highly purified polymer was modified through the inclusion therein of about 0.1 weight percent of 2,2' - methylenebis(4 - methyl-6-tertiarybutylphenol). The resultant composition was heated above the melting point of the polymer. There was no discoloration.

Example II

A standard polymer composition was prepared comprising normally solid high molecular weight polypropylene contaminated with 10 p.p.m. of titanium trichloride and which contained 0.1 weight percent of 2,2'-methylenebis(4-methyl-6-tertiarybutylphenol). A plurality of compounds were homogeneously incorporated into samples of the base composition and the resulting compositions were thereafter melted with the results noted in the following table. About 0.1 weight percent of compound was employed in each sample.

TABLE I

| Reagent Added | Result |
| --- | --- |
| None | Coffee-colored product. |
| Triethylene Glycol | Very slight improvement. |
| Neopentyl Glycol | Do. |
| Polyethylene Glycol 400 | Do. |
| Polyethylene Glycol 4000 | No improvement. |
| Glycerol | White polymer. |

Example III

A polymer composition was prepared, as above described, by homogeneously incorporating into polypropylene, contaminated with 77 p.p.m. of titanium trichloride, about 0.1 weight percent of 2,2'-methylenebis(4-methyl-6-tertiarybutylphenol), and 1.0 weight percent of glycol. The resultant composition was heated above the melting point of the polymer and then cooled. After cooling, the melt had only a slightly off-white color, whereas without the added glycerol, the melt would have had a brown color.

Example IV

A standard polymer composition was prepared comprising normally solid high molecular weight polypropylene which was contaminated with 10 p.p.m. of titanium trichloride. There was homogeneously incorporated into the composition about 0.1 weight percent of glycerol and about 0.1 weight percent of 4,4'-thiobis-(3-methyl-6-tertiarybutylphenol). The resultant composition was heated above the melting point of the polymer and then cooled. After cooling, the melt was clear and colorless, whereas without the added glycerol the melt is light brown in color.

Example V

A standard polymer composition was prepared comprising normally solid high molecular weight polypropylene which was contaminated with 10 p.p.m. of titanium trichloride. There was homogeneously incorporated into the composition about 0.1 weight percent of glycerol and about 0.1 weight percent of 4,4'-methylenebis(2-methyl-6-tertiarybutylphenol). The resultant composition was heated above the melting point of the polymer and then cooled. After cooling, the melt was clear and colorless, whereas without the added glycerol the melt is light brown in color.

Example VI

A standard polymer composition was prepared comprising normally solid high molecular weight polypropylene which was contaminated with 10 p.p.m. of titanium trichloride. There was homogeneously incorporated into the composition about 0.1 weight percent of glycerol and about 0.1 weight percent of 4,4'-methylenebis(2,6-ditertiarybutylphenol). The resultant composition was heated above the melting point of the polymer and then cooled. After cooling, the melt was clear and colorless, whereas without the added glycerol the melt is off-white in color.

What is claimed is:

1. A color stable polymer composition comprising normally solid high molecular weight polypropylene contaminated with less than 100 p.p.m. of titanium and having incorporated therein from about 0.05 to 2 weight percent of glycerol and about .005 to 5 weight percent of an oxidation inhibitor selected from the class consisting of 2,2'-methylenebis(4-methyl-6-tertiarybutylphenol),
4,4'-thiobis(3-methyl-6-tertiarylbutylphenol),
4,4'-methylenebis(2,6-ditertiarybutylphenol) and
4,4'-methylenebis(2-methyl-6-tertiarybutylphenol).

2. A composition as in claim 1 wherein the oxidation inhibitor is 2,2' - methylenebis(4-methyl-6-tertiarybutylphenol).

3. A composition as in claim 1 wherein the oxidation inhibitor is 4,4'-thiobis-(3-methyl-6-tertiarybutylphenol).

4. A composition as in claim 1 wherein the oxidation inhibitor is 4,4' - methylenebis(2-methyl-6-tertiarybutylphenol).

5. A composition as in claim 1 wherein the oxidation inhibitor is 4,4'-methylenebis(2,6-ditertiarybutylphenol).

6. A stabilized polymer composition comprising a normally solid polypropylene, prepared by means of a complex metal catalyst containing titanium having incorporated therein stabilizing amounts of glycerol and 4,4'-thiobis(3-methyl-6-tert butylphenol).

7. A stabilized polymer composition comprising a normally solid polypropylene, prepared by means of a complex metal catalyst containing titanium, having incorporated therein stabilizing amounts of glycerol and a bisphenol selected from the group consisting of 4,4'-thiobis (3-methyl-6-tert-butylphenol) and 2,2'-methylenebis (4-methyl-6-tert-butylphenol).

8. A method for stabilizing a normally solid high molecular weight polymer of propylene contaminated with less than 100 p.p.m. of titanium which comprises homogeneously incorporating into the polymer from about 0.05 to 2 weight percent of glycerol and about .005 to 5 weight percent of an anti-oxidant selected from the class consisting of 2,2'-methylenebis(4-methyl-6-tertiarybutylphenol),
4,4'-thiobis(3-methyl-6-tertiarybutylphenol),
4,4'-methylenebis(2,6-ditertiarybutylphenol) and
4,4'-methylenebis(2-methyl-6-tertiarybutylphenol).

References Cited by the Examiner

UNITED STATES PATENTS

| | | | |
| --- | --- | --- | --- |
| 2,427,071 | 9/1947 | Reuter | 260—45.95 |
| 2,459,746 | 1/1949 | Radcliffe | 260—45.95 |
| 2,675,366 | 4/1954 | Pullman | 260—45.95 |
| 2,834,768 | 5/1958 | Friedlander | 260—45.95 |
| 2,940,949 | 6/1960 | Mullin | 260—45.95 |
| 2,985,617 | 5/1961 | Salyer et al. | 260—45.95 |
| 2,999,841 | 9/1961 | Csendes | 260—45.95 |

FOREIGN PATENTS

| | | |
| --- | --- | --- |
| 1,012,753 | 7/1957 | Germany. |
| 772,938 | 4/1957 | Great Britain. |
| 797,344 | 7/1958 | Great Britain. |

LEON J. BERCOVITZ, *Primary Examiner.*

ALLEN M. BOETTCHER, ALPHONSO D. SULLIVAN, MILTON STERMAN, JOSEPH R. LIBERMAN, *Examiners.*

S. H. BLECH, H. W. HAEUSSLER, H. E. TAYLOR, *Assistant Examiners.*